April 4, 1944.　　J. P. McGLAUGHLIN, SR　　2,345,983
INSTANT UNLOADING PRESS AND DEHYDRATOR
Filed Feb. 15, 1941　　3 Sheets-Sheet 1
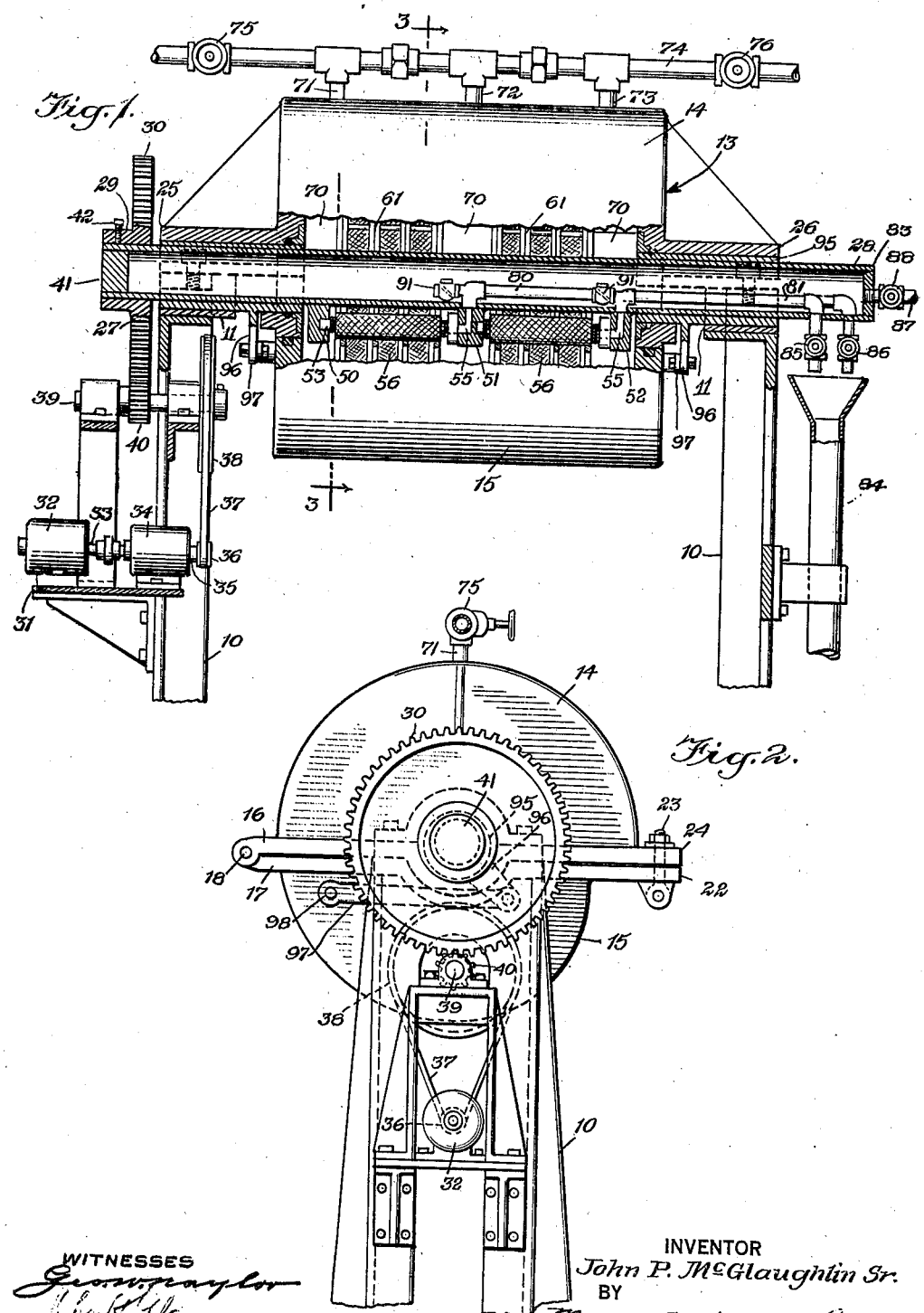
INVENTOR
John P. McGlaughlin Sr.
BY
ATTORNEYS April 4, 1944.  J. P. McGLAUGHLIN, SR  2,345,983
INSTANT UNLOADING PRESS AND DEHYDRATOR
Filed Feb. 15, 1941  3 Sheets-Sheet 2
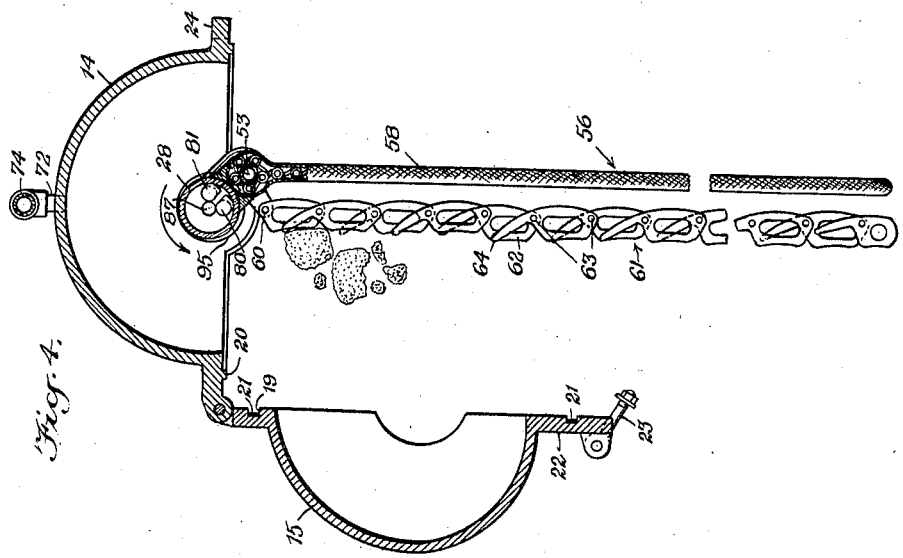
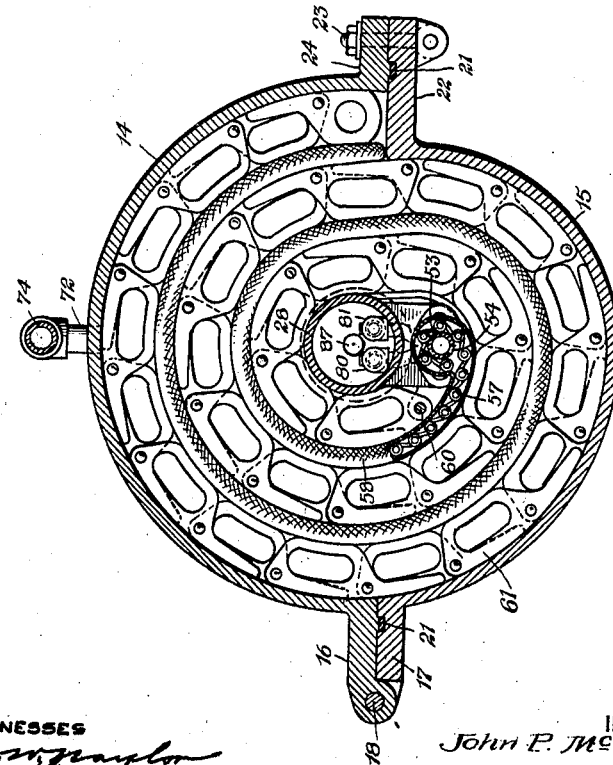
WITNESSES
INVENTOR
John P. McGlaughlin Sr.
BY
Munn, Anderson & Liddy
ATTORNEYS April 4, 1944. J. P. McGLAUGHLIN, SR 2,345,983
INSTANT UNLOADING PRESS AND DEHYDRATOR
Filed Feb. 15, 1941 3 Sheets-Sheet 3

WITNESSES

INVENTOR
John P. McGlaughlin Sr
BY
ATTORNEYS

Patented Apr. 4, 1944

2,345,983

UNITED STATES PATENT OFFICE 2,345,983

INSTANT UNLOADING PRESS AND DEHYDRATOR

John P. McGlaughlin, Sr., Peekskill, N. Y.

Application February 15, 1941, Serial No. 379,058

12 Claims. (Cl. 210—182)

This invention relates to filter presses and particularly to a rotatable instant unloading press and dehydrator.

The invention has for its object the provision of a filter press having a substantially cylindrical casing and a windable filter structure adapted to be wound and positioned within the casing when in use but readily unwound for unloading purposes, and when unwound so positioned as to be readily accessible.

Additional objects and advantages will be apparent from the accompanying drawings, in which Fig. 1 is a side view of a filter press disclosing an embodiment of my invention with certain parts broken away;

Fig. 2 is an end view of the structure shown in Fig. 1;

Fig. 3 is a transverse sectional view on an enlarged scale through Fig. 1, approximately on the line 3—3 of Fig. 1;

Fig. 4 is a view similar to Fig. 3 but illustrated on a small scale with the filtering structure unwound;

Figure 5:
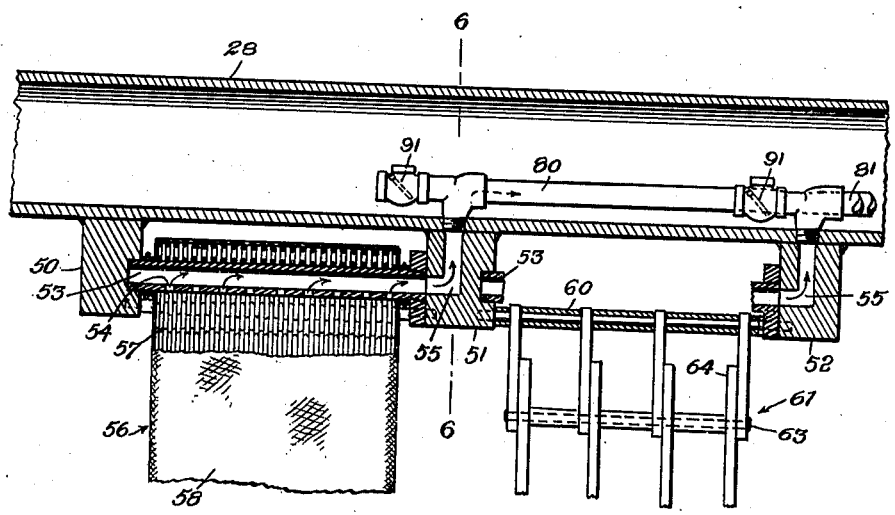
Fig. 5 is a fragmentary sectional view through the center of Fig. 4.

Referring more particularly to the drawings, I provide a right-hand and a left-hand frame 10 which may be made of metal or other suitable material. A casing 13 has an upper portion 14 and a lower portion 15. The casing 13 while generally cylindrical in shape is not a true cylinder but is shaped to conform with the wound filtering structure hereinafter described. The portions 14 and 15 have hinged members 16 and 17 joined by a pin 18. A shoulder 20 in the portion 14 engages a groove carrying a gasket 21 in the member 15 to insure a tight connection when the casing 13 is closed. The members 16 of the upper portion 14 have semi-cylindrical bearings 11 respectively which rest in similar shaped portions on the frames 10 to support the casing 13.

The flange 22 on the member 15 carries a series of hinged bolts 23 adapted to engage slots in the flange 24 of the member 14. It will be seen, therefore, that by swinging the member 15 upwardly and engaging the bolts 23 with the slots in the flange 24, a tight closure of the casing may be secured. Caps 25 and 26 are arranged on the eccentric sleeve 95 respectively and are bolted to said frames 10 respectively. The casing 13 is thus held stationary on the frames 10. A rotatable hollow shaft or tube 28 extends through said sleeves. This shaft 28 is adapted to rotate within the cylinder and adjacent the end 29 thereof is mounted a gear wheel 30.

Mounted on the left-hand frame 10, on the platform 31, is a motor 32 attached by the shaft 33 to the gear reducing mechanism 34. The gear reducing mechanism is provided with a shaft 35 and a pulley 36 which engages the belt 37 operating the pulley 38 and thus rotating the shaft 39. Mounted on the shaft 39 is a pinion 40 which engages the gear wheel 30. The motor 32 is a reversible motor and power is transmitted by it through the reducing mechanism 34 by means of the belt 37 to rotate the shaft 39 and the pinion 40 in either direction. Thus it will be seen that the tube or hollow shaft 28 may be rotated clockwise or counter-clockwise. A plug 41 held in place by a screw 42 closes the end 29 of the shaft 28. The shaft 28 has a series of depending members 50, 51 and 52 depending in number upon the number of sections to be included in the filter press. The number of sections depends entirely upon the size and capacity of the press desired. While I have illustrated a press having two sections, it will be appreciated that this number can be increased or decreased without affecting the operation of my press.

Extending between the members 50 and 51 is a foraminous pipe 53 provided with openings 54 and leading to a passage 55 in the member 51. The filtering member 56 consists of a flexible body 57 preferably of link mesh. The body 57 has a loop or tunnel on one end through which the pipe 53 extends. Enclosing the flexible body 57 and extending around the pipe 53 is a filter sack 58 made of cotton or any suitable textile fabric. The sack 58 completely encloses the member 57. The mesh 57 is preferably made of metal but may be made of any suitable material without departing from the spirit of the invention. By reason of its articulated structure it readily permits the passage of liquid therethrough.

Mounted below the pipe 53 and extending between the members 50, 51 and 52 is an axle or shaft 60. Pivotally mounted on the shaft 60 is a spacing member 61. The shaft 60 is preferably slightly offset from the pipe 53 so that when unwound the spacing member 61 and the filtering member 56 will be suspended in a parallel relationship. The spacing member 61 consists of a series of links 62 connected by suitable rods 63. Each link 62 is a generally elongated structure having an extension on the upper side of the link presenting a finger 64. The topmost link is pivotally mounted to the axle 60.

When the filter is to be charged the motor 32 is started and the shaft 28 turns in a counterclockwise direction, as indicated in Figs. 3 and 4, the filtering member 56 and the spacing member 61 being wound around the shaft 28 until they are in the position shown in Fig. 3. The cylinder is then closed in the manner heretofore described and the filter is ready for charging. As has been previously pointed out, the filter may consist of a plurality of sections each having a separate filter and spacing element. A passageway 70 is provided on each side of these sections and pipes 71, 72 and 73 lead out of the cylinder at the top into the passageway 70. A pipe 74 having valves 75 and 76 leads to the pipes 71, 72 and 73.

Figure 6:
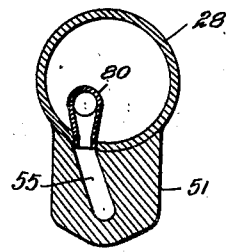
Fig. 6 is a cross-sectional view taken on approximately the line 6—6 of Fig. 5.

As shown in Figs. 5 and 6, the apertured pipe 53 leads to the passageway 55. The passageway 55 in turn is connected to the pipe 80. Since each section of the machine will require a separate pipe, the passageway 55 is set at an angle so that the pipe 80 may be placed along one side of the shaft 28 and additional pipes, such as 81, from other sections may be easily positioned in the shaft 28. The pipes 80 and 81 lead to the end 83 of the shaft 28 and may be discharged into the discharge pipe 84 through the valves 85 and 86. An additional flow pipe 87 with a valve 88 is positioned in the end 83 of the shaft 28. As was previously brought out, when the filter is to be charged, the spacing members 61 and the filtering element 56 are wound upon the shaft 28 by means of the motor 32. The valve 75 and the valve 88 are normally closed and the charge is introduced through the pipe 74 through the valve 76 into the pipes 71, 72 and 73. It will then be forced by pressure through the open spaces in the links 62 through the filtering element 56 where the solid matter will be deposited and the liquid will pass eventually through the openings 54 in the pipe 53. The filtrate will then pass through the passage 55 and the pipe 80 into the pipe 84 where it will be carried off.

If it is desired to wash or cleanse the filtering medium, water may be introduced through the pipe 87 and the valve 88 after the valves 85, 86 and 76 are closed. The pipe 80 is provided with check valves 91 which will allow water to flow into the pipe 80 back through the passage 55, but which will not allow water passing from the passage 55 into the pipe 80 to flow out into the hollow shaft 28. Water is introduced into the shaft 28 through the pipe 87. It will flow back through the valves 91, back through the passage 55, through the filtering element 56, the spacer 61, and out through the pipes 71, 72 and 73 into the pipe 74 and out through the valve 75.

When it is desired to empty or discharge the filter cake, the bolts 23 are loosened and the shaft 28 is rotated in a clockwise direction by means of the motor 32. This will allow the bottom section 15 to drop, as shown in Fig. 4, and permit the members 56 and 61 to hang down in a parallel vertical plane. The action of the spacing element 61 will remove the filtering cake in both the spacing element 61 and the filtering element 56. This movement is increased by the action of the fingers 64 of the link 62 which will force the cake outwardly and away, since the curved surface will not stick to the straightened face of the member. It has been found that the spacing element and the cake may have a tendency to cling to the upper portion 14 of the casing and in order to avoid any such possibility the eccentric sleeve 95 has been provided. The sleeve has attached thereto an arm 96 which engages a link 97 pivoted at 98 to the lower portion 15 of the casing 13.

As the lower portion 15 is dropped the action of the link 97 will cause the eccentric sleeve 95 to turn and to pull the filtering parts away from the portion 14, thus making the discharge simple and more complete.

I claim:

1. In a filter press, a pressure tight casing, a filter structure adapted to be wound and unwound arranged within said casing, a spacing member to engage the filter structure, means extending horizontally of the casing and connected with the filter structure and spacing member to spirally wind the same so that when completely wound the filter structure will coact with the casing to exert pressure, power means exteriorly of the casing and connected with said first means to rotate the latter, to wind said filter structure and spacing member on said first means or to unwind the same therefrom, while said first means extends as aforesaid, said casing having a movable section which may be moved to an open position so as to enable the winding and unwinding operations aforesaid, charging means for forcing the matter to be filtered into said casing and through said spacing member into contact with said filter structure, and means extending into said casing for directing the filtrate to a discharge point outside of said casing.

2. In a filter press, a casing, a hollow rotatable shaft extending horizontally through said casing, an apertured pipe positioned on said shaft and communicating with the interior thereof, a filter member having one end connected with said pipe in communication with the interior thereof, a spacer member on said shaft adjacent said filter member, said filter member and spacer member being spirally wound upon rotation of said shaft and when completely wound coacting with said casing to exert pressure, means connected with said shaft to rotate the latter to wind the filter and spacer members about the shaft while the latter extends as aforesaid, said casing having a movable section which may be moved to an open position so as to enable the winding operation aforesaid, means for forcing matter to be filtered into said casing and through said pipe, filter member and spacer member while wound as aforesaid, and additional means for introducing cleaning liquid into said shaft, through said pipe, filter member, spacer member, and out of said casing.

3. In a filter press, a substantially cylindrical stationary casing divided into a plurality of sections hingedly connected longitudinally, means for securing said sections together and enabling one section to be dropped to open position, a flexible filter structure within the casing, a flexible spacing structure, power actuated means for winding said filter and spacing structures into a convolute formation, said power actuated means also serving for uncoiling said structures when said casing is opened, whereby said filter structure and said spacing structure will hang vertically under the action of gravity, means for feeding matter to be filtered into said casing, and means for leading the filtrate from the casing.

4. In a filter press, a stationary casing divided into two parts hingedly connected longitudinally, means for securing said parts together and enabling one part to be dropped to open position, a supporting shaft rotatably mounted substantially centrally of said casing, a substantially flat rectangular sheet filter member connected at one end to said shaft, a substantially flat rectangular flexible spacer sheet secured at one end to said shaft near where the filter member is secured so that the spacer sheet and the filter member may hang in substantially parallel vertical planes when the casing is open, power actuated means connected with said shaft for winding simultaneously said spacer sheet and said filter member into a convolute formation in said casing, said power actuated means also serving for unwinding said spacer sheet and said filter member simultaneously for unloading the press cake, means for charging matter to be filtered into said casing and through said filter member, and means extending from the filter member to a point outside the casing for discharging the filtrate.

5. A filter press, as set forth in claim 4, characterized by forming the spacer sheet of a plurality of rows of links and rods for connecting said links together in a sheet formation, each of said links having a substantially rectangular body, and a cake breaking and ejecting finger at one end extending substantially axially of the link.

6. In a filter press, a stationary casing longitudinally divided and consisting of an upper section and a lower section connected with the upper section for movement to an open position, a hollow rotatable shaft extending axially through said casing, a filter structure adapted to be wound and unwound, means connecting one end of said filter structure with said shaft, means connected with said shaft to rotate the shaft to wind the filter structure thereon in contact with said casing to exert pressure and to unwind it from the shaft, means to introduce matter to be filtered into said casing to be acted on by said filter structure when wound, and means leading from said filter structure to discharge the filtrate, said lower casing section when in open position enabling said filter structure to be unwound and hang down to discharge the residue resulting from the filtering operation.

7. In a filter press as set forth in claim 6 wherein said last means leads through said shaft and first-mentioned means.

8. In a filter press as set forth in claim 6, means coacting with said shaft and lower casing section to change the position of said shaft so that said filter structure while still wound on the shaft and as said lower casing section is moving to its open position will enable the filter structure to move bodily out of contact with the upper casing section.

9. In a filter press, a stationary cylindrical casing, a rotatable shaft extending axially through said casing, a filter structure within said casing having one end connected with said shaft and adapted to be wound on said shaft and unwound therefrom upon the rotation of the shaft in opposite directions, power means exteriorly of the casing and connected with said shaft for winding and unwinding the filter structure, said filter structure when wound on said shaft being in contact with the cylindrical wall of the casing to exert filtering pressure, said casing having an upper section and a lower section pivotally connected to the upper section which may be swung to an open position to enable the filter structure when unwound to hang downwardly from said shaft, and means to cause the filter structure while being unwound from the shaft to move out of contact with said wall.

10. In a filter press as set forth in claim 9 wherein said last means is connected with said lower casing section and the shaft to cause the change in the position of the shaft when the lower casing section is being swung to its open position.

11. In a filter press as set forth in claim 9 wherein said last means includes eccentric sleeves surrounding the opposite ends respectively of said shaft.

12. In a filter press as set forth in claim 9 wherein said last means comprises eccentric sleeves surrounding the opposite ends respectively of said shaft, arms on said sleeves respectively, and links having their opposite ends pivotally connected with said arms and ends respectively of the lower casing section, the movement of said casing section through the intervention of said sleeves, arms and links causing the change in the position of the shaft for the purpose mentioned.

JOHN P. McGLAUGHLIN, Sr.